United States Patent
Giri et al.

(10) Patent No.: US 12,489,369 B2
(45) Date of Patent: Dec. 2, 2025

(54) NON-ISOLATED MULTIPORT DC-DC CONVERTER TO INTEGRATE MULTIPLE ENERGY SOURCES FOR ELECTRIFIED VEHICLES

(71) Applicant: COUNCIL OF SCIENTIFIC AND INDUSTRIAL RESEARCH, New Delhi (IN)

(72) Inventors: Santu Kumar Giri, Durgapur (IN); Pratim Bhattacharyya, Durgapur (IN); Soumitra Ghorai, Durgapur (IN); Siddheswar Sen, Durgapur (IN); Naresh Chandra Murmu, Durgapur (IN)

(73) Assignee: Council for Scientific and Industrial Research (CSIR), New Delhi (IN)

( * ) Notice: Subject to any disclaimer, the term of this patent is extended or adjusted under 35 U.S.C. 154(b) by 0 days.

(21) Appl. No.: 18/605,323

(22) Filed: Mar. 14, 2024

(65) Prior Publication Data

US 2024/0313654 A1    Sep. 19, 2024

(30) Foreign Application Priority Data

Mar. 14, 2023    (IN) .............................. 202311017239

(51) Int. Cl.
*H02M 3/158*    (2006.01)
*B60L 1/00*    (2006.01)
(Continued)

(52) U.S. Cl.
CPC ............ *H02M 3/1582* (2013.01); *B60L 1/00* (2013.01); *B60L 15/007* (2013.01); *B60L 50/40* (2019.02);
(Continued)

(58) Field of Classification Search
CPC ......... H02M 3/1582; H02M 1/14; B60L 1/00; B60L 15/007; B60L 50/40; B60L 50/75;
(Continued)

(56) References Cited

U.S. PATENT DOCUMENTS 8,853,888 B2    10/2014    Khaligh
11,264,904 B2 *    3/2022    Wilhide ................ H02M 3/158
(Continued)

FOREIGN PATENT DOCUMENTS

| CN | 106026646 | 10/2016 |
| CN | 111371317 | 7/2020 |
| CN | 112737328 | 4/2021 |

OTHER PUBLICATIONS

Single Inductor Bidirectional Multi-Input Converter With Continuous Battery Current Based On Integration of Buck and Three Port Boost Topologies (Year: 2022).*
(Continued)

*Primary Examiner* — Rexford N Barnie
*Assistant Examiner* — Joshua James Sweet
(74) *Attorney, Agent, or Firm* — Fish & Richardson P.C.

(57) ABSTRACT

The technology described herein discloses a non-isolated multiport dc-dc converter with three input dc ports to integrate three different energy sources namely fuel cell, battery and ultracapacitor, and two dedicated output ports for traction load and auxiliary loads, respectively. The invented system is capable of providing high flexibility in power flow management among the three energy sources, corresponding to diverse dynamic load power events encountered in an EV. Besides, the system exhibits prominent features like simultaneous and bidirectional power transferring capability between the multiple dc ports and single stage power processing in every possible power flow scenarios. Furthermore, the technology embodies distinct
(Continued)

operating modes depending upon the dynamic load power variations and state of voltage levels of the energy sources. Nevertheless, the technology aims at improving the utilization efficiency of the energy storage system by maneuvering power flows between multiple dc ports, thereby augmenting the overall performance of EV powertrain.

11 Claims, 11 Drawing Sheets

(51) Int. Cl.
  *B60L 15/00* (2006.01)
  *B60L 50/40* (2019.01)
  *B60L 50/75* (2019.01)
  *H02J 7/34* (2006.01)
  *H02M 1/14* (2006.01)
(52) U.S. Cl.
  CPC .............. *B60L 50/75* (2019.02); *H02J 7/345* (2013.01); *H02M 1/14* (2013.01); *B60L 2210/12* (2013.01); *B60L 2210/14* (2013.01); *H02J 2207/20* (2020.01); *H02J 2207/50* (2020.01)
(58) Field of Classification Search
  CPC .. B60L 2210/12; B60L 2210/14; H02J 7/345; H02J 2207/20; H02J 2207/50
  USPC ........ 307/18, 19, 21, 25, 28, 29, 34, 39, 43, 307/46, 48; 320/101, 123, 126, 129, 140, 320/166

See application file for complete search history.

(56) References Cited

U.S. PATENT DOCUMENTS

| | | | |
|---|---|---|---|
| 2008/0136260 A1* | 6/2008 | Watanabe | B60L 58/40 307/18 |
| 2008/0277175 A1* | 11/2008 | Tyler | B60L 58/33 320/101 |
| 2021/0135577 A1 | 5/2021 | Li et al. | |
| 2023/0170801 A1* | 6/2023 | Tse | H02M 1/009 363/16 |

OTHER PUBLICATIONS

Jalilzadeh et al., "Multiport DC-DC Converter with Step-Up Capability and Reduced Voltage Stress on Switches/Diodes," IEEE Transactions on Power Electronics, Nov. 2020, 35(11): 11902-11915.

Rostami et al., "Design and Implementation of a Multiport Converter Using Z-Source Converter," IEEE Transactions on Industrial Electronics, Oct. 2021, 68(10):9731-9741.

Varesi et al., "Design and Analysis of a Developed Multiport High Step-Up DC-DC Converter With Reduced Device Count and Normalized Peak Inverse Voltage on the Switches/Diodes," IEEE Transactions on Power Electronics, Jun. 2019, 34(6):5464-5475.

* cited by examiner

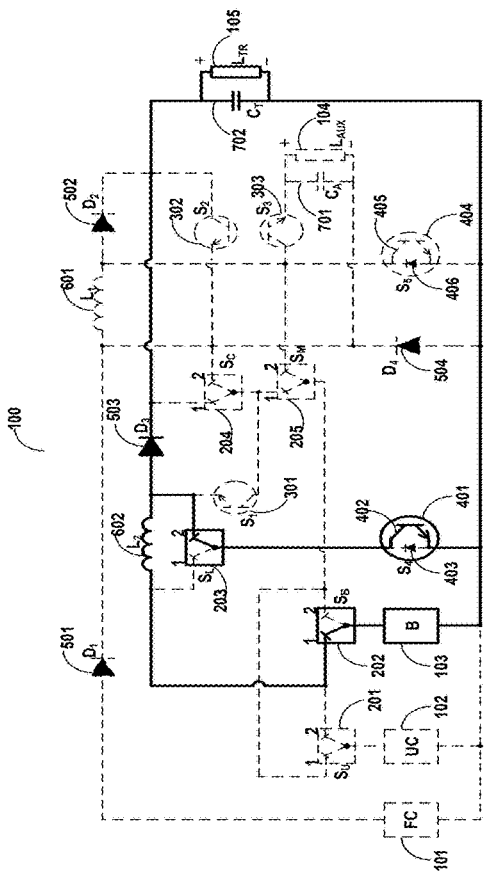

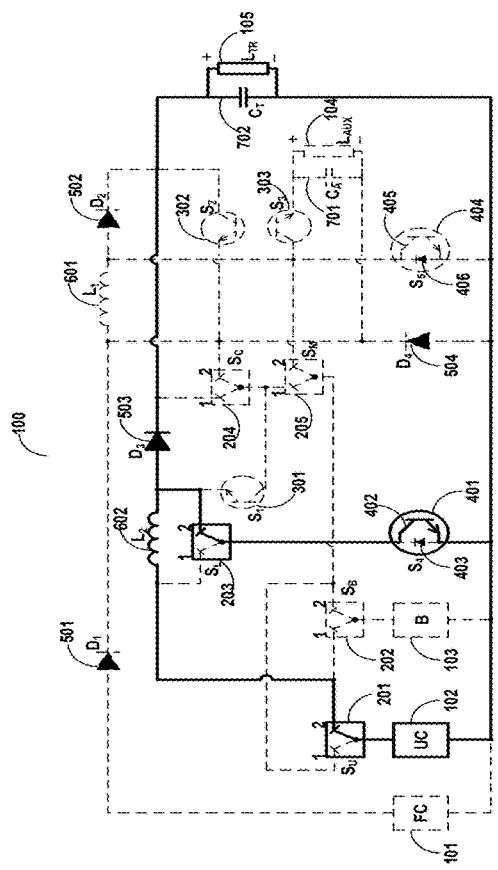

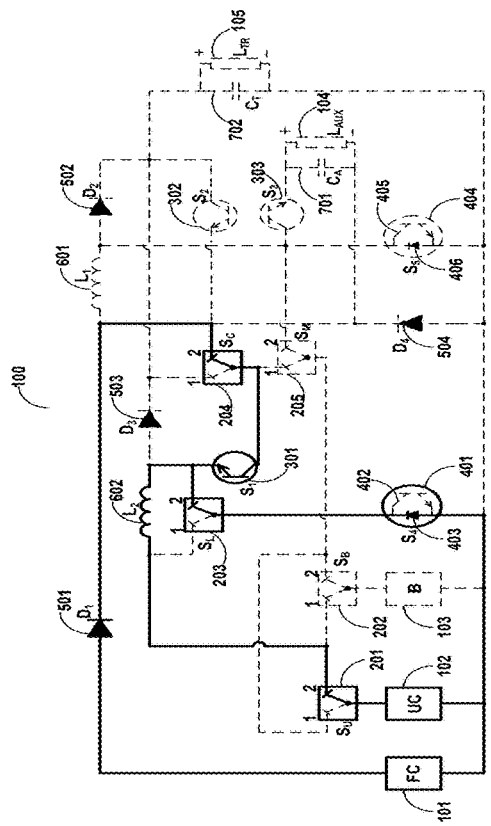
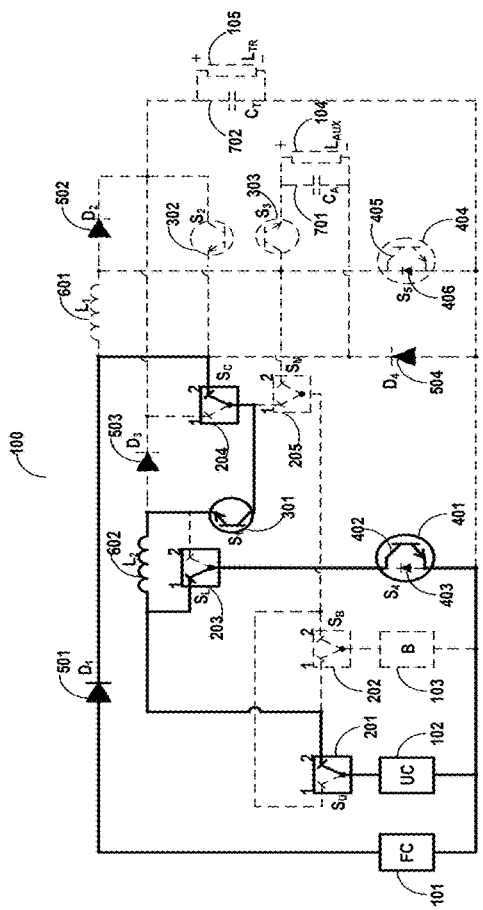
Figure 5b
Figure 5a

NON-ISOLATED MULTIPORT DC-DC CONVERTER TO INTEGRATE MULTIPLE ENERGY SOURCES FOR ELECTRIFIED VEHICLES

CROSS-REFERENCE TO RELATED APPLICATIONS

This application claims the benefit of priority to Indian Application No. 202311017239, filed on Mar. 14, 2023, the contents of which are hereby incorporated by reference.

TECHNICAL FIELD

The technology described herein generally relates to a dc-dc power conversion system incorporating multiple energy sources and more specifically to a non-isolated multiport dc-dc converter configuration which integrates multiple energy sources like fuel cell, battery and ultracapacitor for supplying multiple loads including traction load and auxiliary loads for an electrified vehicle (EV). It manages to achieve flexibility of power flow management among the different energy sources under diverse dynamic load power scenarios pertaining to possible driving events of an electrified vehicle.

BACKGROUND

Reference may be made to the U.S. Pat. No. 8,853,888B2 wherein the invention is related to a non-isolated multiple-input dc-dc converter for an EV that is capable of bidirectional operation in buck, boost and buck-boost modes. The technology described herein is different from the patented invention both in terms of configuration and operational features. One of the major drawbacks of the patented invention is that the dc-dc converter consists of only a single output port which restricts its capability to integrate multiple load types. Another drawback of the patented invention is that the operation of the dc-dc converter is only limited to transfer of power between energy sources and load; and it does not disclose any method of operation related to inter-transfer of power between the multiple energy sources connected at the input ports.

Reference may be made to the Patent No: US2021/0135577A1 wherein the invention relates to a non-isolated modular multiport dc-dc converter topology which can incorporate an unlimited number of independent input or output ports. However, the patented invention suffers from poor switch economy since it employs greater number of switching devices for each of the input ports while achieving marginal operational flexibility.

Furthermore, the configuration employs dedicated inductors for controlling each of the input energy sources without providing any possibility for sharing of inductors, thereby demonstrating inferior integration.

Reference may be made to the Patent No: CN111371317A wherein the invention is related to an extensible non-isolated double input boost converter. First of all, the patented converter configuration consists of only three numbers of ports to integrate two types of input energy sources and a single type of load. The drawback of the invention is the absence of bidirectional power transfer capability at the load port which restrains its operation during regenerative power flow from the load, thereby establishing the ineffectiveness of the configuration for EV applications. Furthermore, the patented configuration does not exhibit the provision for the transfer of charging power in between the two input energy sources.

Reference may be made to the Patent No: CN112737328A wherein the invention is related to a high gain non-isolated three port converter for integrating a photovoltaic (PV) cell, a battery and a load. The main drawback of the invention is the exploitation of greater number of magnetic components for achieving power management among three ports which inadvertently increases the size and inflicts cost burden to the energy storage system. The converter employs an extra inductor which serves no additional purpose except for executing the buck mode charging of battery from the PV. This depicts improper sharing and under-utilization of components thereby exhibiting poor integration of energy sources. Additionally, the invention does not provide any configurational facility to allow reverse flow of regenerative power from the load, thereby restricting its usage for EV applications.

Reference may be made to the Patent No: CN106026646A wherein the invention is related to a non-isolated three port converter for photovoltaic (PV) cell and battery based dc microgrid application. The configuration lacks in providing flexibility of allocating the desired energy source with either of the inductors depending upon the power level, which is preferable in order to ensure a proper power flow management. Another drawback of the configuration is the absence of separate power flow paths for battery charging and load power delivery from the PV which hinders the performance during simultaneous execution of both the operations. Furthermore, the system lacks generality in the method of charging of the battery from the PV, which is restricted to boost mode of operation, thereby limiting the functionality of the configuration for a selective range of voltage ratings of the energy sources.

Reference may be made to the research paper entitled 'Design and Analysis of a Developed Multiport High Step-Up DC-DC Converter With Reduced Device Count and Normalized Peak Inverse Voltage on the Switches/Diodes' wherein a high step-up non-isolated non-coupled inductor based multiport dc-dc converter has been proposed. The proposed three port converter configuration though succeeds in providing high voltage gain but exploits greater number of magnetic components which in turn increases the size and circuit complexity. Besides, the configuration deficits in providing single stage power conversion during power transfer between both the input ports thereby affecting efficiency.

Reference may be made to the research paper entitled 'Multiport DC-DC Converter with Step-Up Capability and Reduced Voltage Stress on Switches/Diodes' wherein a non-isolated dual input dual output dc-dc converter is proposed and analyzed. The drawback of the configuration is the lack of provision for simultaneous power transfer from both the input sources. Furthermore, the configuration does not provide bidirectional power transfer capability in neither of the output ports which restricts its applicability for current reversible type of loads.

Reference may be made to the research paper entitled 'Design and Implementation of a Multiport Converter Using Z-source Converter' wherein a four port dc-dc converter based on a Z-source converter is proposed and analyzed. The configuration deficits in providing flexibility of reallocation of multiple energy sources for ensuring a dynamic power flow management. In addition, the configuration lacks independent control over the energy sources through separate power flow paths during simultaneous power transfer scenarios and neither does it offer any provision for facilitating the reverse flow of regenerative current from load.

From the above prior art details, it is observed that the systems described demonstrate significant drawbacks and dissimilarities from the technology described herein in various aspects of configuration and operational features.

OBJECTIVES

Energy storage system for an EV plays a very crucial role in the performance of the vehicle during various driving scenarios like steady speed operation, acceleration, regenerative braking etc. Hence, it needs to be designed appropriately in order to achieve an optimal performance. But, an energy storage system based on merely a single energy source is insufficient to meet the dynamic power requirements of an EV. In view of this, incorporation of multiple energy sources proves to be an effective solution to satisfy the dynamic power requirements, without having to excessively increase the size of the single energy source. However, when multiple energy sources are introduced into the vehicle's powertrain, the configuration and control between the multiple energy sources becomes challenging. Therefore, the problem of appropriate configuration and control of the multiple energy sources to ensure efficient operation of the vehicle's powertrain and to enhance the performance of the vehicle while dealing with variety of dynamic driving conditions needs to be resolved within the industry. Conventionally, in order to achieve a suitable power management among the different energy sources, multiple numbers of standard two port dc/dc converter dedicated for each energy source are needed to be employed, which is quite an inefficient and non-economical solution. In this perspective, a multiport dc-dc converter having more than two numbers of input and/or output ports, emerges as a more viable solution since it provides a unified platform for integrating multiple energy sources and aims at achieving power diversification among the different energy sources. Accordingly, the technology described herein aims to resolve the aforementioned problems while duly addressing the drawbacks of the cited prior arts by providing a non-isolated (transformer less) multiport dc-dc converter with five dc ports to integrate three types of energy sources like fuel cell, battery and ultracapacitor, and two dedicated load ports for feeding traction load and auxiliary loads for an EV. The system described in the technology described herein is capable of providing flexibility in power flow management among the three different energy sources, corresponding to diverse dynamic events of steady speed operation, acceleration and regenerative braking of the vehicle. This ensures improved utilization of the energy sources as well as the circuit components, thereby enhancing the power delivering and regenerative power recuperation capability of the overall energy storage system. Apart from that, the invented converter configuration also exhibits certain prominent features like simultaneous and bidirectional power transferring capability in multiple dc ports with single stage power processing in every possible power flow combinations. Furthermore, the technology described herein embodies multiple distinct operating modes of the aforesaid multiport dc/dc converter depending upon the dynamic load power variations and state of voltage levels of the energy sources. The system described herein is equally adaptable regardless of voltage ratings of each of the energy sources. On the whole, the technology described herein aims at improving the efficiency of the energy storage system by maneuvering the power flows between multiple dc ports, thereby augmenting the overall performance of the EV powertrain.

One objective of the technology described herein is to provide a Non-Isolated Multiport DC-DC Converter to Integrate Multiple Energy Sources for Electrified Vehicles, which potentially obviates the drawbacks of the hitherto known prior art as detailed above.

Some of the objects of the present disclosure are aimed to ameliorate one or more problems of the prior art or to at least provide a useful alternative are listed herein.

Another object of the technology described herein is to integrate fuel cell, battery and ultracapacitor on a unified dc-dc power conversion platform through separate dc ports.

Still another object of the technology described herein is to interface two different types of loads like traction load and auxiliary loads of an electrified vehicle on a single integrated power conversion platform through separate dc ports.

Yet another object of the technology described herein is to provide distinct operating modes of the non-isolated multiport converter for delivering tractive power to the load from either of the fuel cell, or battery or cumulatively from both, corresponding to diverse dynamic load power scenarios.

Still another object of the technology described herein is to provide distinct operating modes of the non-isolated multiport converter for delivering tractive power to the load cumulatively from either of fuel cell and ultracapacitor, or battery and ultracapacitor, corresponding to peak load power demands.

Yet another object of the technology described herein is to provide distinct operating modes of the non-isolated multiport converter to engage the fuel cell for delivering tractive power to the load and charging of either the ultracapacitor or the battery, simultaneously.

Still another object of the technology described herein is to provide distinct operating modes of the non-isolated multiport converter to engage the battery for delivering tractive power to the load and charging the ultracapacitor, simultaneously.

Yet another object of the technology described herein is to provide distinct operating modes of the non-isolated multiport converter to engage the fuel cell for delivering tractive power to the load while charging the ultracapacitor from the battery.

Still another object of the technology described herein is to provide distinct operating modes of the non-isolated multiport converter for recuperating the regenerative power from the load in to either of the battery or ultracapacitor or both, corresponding to regenerative braking scenarios.

Yet another object of the technology described herein is to provide the operating mode of the non-isolated multiport converter for continually supplying the auxiliary load power from either of the energy sources or from regenerative power regardless of the power transfer scenarios.

SUMMARY

In carrying out principles of the technology described herein in accordance with an embodiment thereof, one aspect of the technology described herein is to provide a non-isolated multiport dc-dc converter configuration having five dc ports to integrate multiple energy sources like fuel cell, battery and ultracapacitor for feeding traction load and auxiliary loads of an electrified vehicle. Here, the fuel cell refers to fuel cell stacks, which encompasses multiple number of fuel cells configured in series and/or parallel connection along with the balance of plant (BoP) and other mechanical counterparts like fuel storage tank, fuel processors, air compressors, humidifiers etc. Likewise, the ultracapacitor refers to an ultracapacitor module which encompasses multiple ultracapacitor cells configured in series and/or parallel connection with necessary charge balancing circuitry to prevent against inadvertent overcharging of a single cell due to an energy imbalance between multiple cells. In the similar manner, the battery refers to a battery pack which encompasses multiple battery cells configured in series and/or parallel connection with necessary battery management system to ensure effective cell balancing and prevent against undesirable over current and/or overvoltage. The traction load refers to the electric motor drivetrain corresponding to the electric propulsion unit of an electrified vehicle whereas the auxiliary loads refers to various accessory units including power steering, power windows etc which are operated at a lower voltage level. In the technology described herein, the converter configuration consists of a plurality of high frequency and low frequency switches to selectively engage, control and reallocate the desired energy source for maneuvering the flow of power depending upon dynamic load power scenarios corresponding to steady speed, acceleration or regenerative braking of the vehicle. The converter configuration further consists of a plurality of inductors which can be periodically energized or de-energized in order to accomplish the desired mode of operation by either stepping up (boost) or stepping down (buck) the voltage for transferring of power between dc ports of the converter. Here, the term 'energize' refers to storing of electromagnetic energy in the inductor with the passage of electrical current therethrough. Alternatively, the term 'de-energize' refers to the releasing of electromagnetic energy from the inductor with the passage of electrical current therethrough. The term 'couple' used in this specification signifies forming an electrical connection i.e a connection that allows the passage of current therethrough. Likewise, the term 'decouple' signifies being electrically disconnected i.e disruption of the passage of current therethrough. The other technical terms like 'power' and 'energy' signifies electrical power or energy and are used interchangeably in the specification. Unless otherwise defined, any other technical or scientific terms used in this specification will retain the ordinary meaning as understood by a layperson in the technical field of the technology described herein. "First", "second" and other similar words used in the present specification and claims do not specify any particular order, quantity or importance, but are simply used for distinguishing different components or elements of the technology.

One feature of the technology described herein is the configuration of non-isolated multiport dc-dc converter consisting of five dc ports and incorporating two numbers of inductors and a plurality of high frequency and low frequency switches which is capable of achieving power diversification among three types of energy sources namely fuel cell, battery and ultracapacitor and two types of loads namely traction load and auxiliary loads. There are also a number of distinct novel operating modes of the non-isolated multiport converter which governs power diversification among the multiple dc ports. Some novel features of the non-isolated multiport converter are stated below:

1. The configuration demonstrates high level of integration since it manages to accomplish the desired flexibility in multiple power transfer scenarios among five dc ports by utilizing only two inductors.
2. The configuration ensures single stage power processing in every possible power flow combinations between multiple ports.
3. The configuration provides independent control over each energy source through separate inductors when more than one energy sources are engaged during simultaneous power transfer scenarios.
4. The fuel cell can be engaged to simultaneously deliver power to the traction load and provide charging power to either of the energy sources among battery and ultracapacitor.
5. The battery can be engaged to deliver power to the traction load while at the same time provide charging power to the ultracapacitor.
6. Any two energy sources amongst fuel cell, battery and ultracapacitor can be engaged simultaneously for delivering power to the traction load.
7. The fuel cell can be engaged for delivering power to the load simultaneously when the battery provides charging power to the ultracapacitor.
8. The charging of the ultracapacitor can be fulfilled from either of the battery or fuel cell or even by the regenerative power from the traction load.
9. Both the battery and the ultracapacitor can be engaged either individually or simultaneously to deliver power to the traction load, and also for recuperating energy from the traction load during regeneration.

Apart from the aforementioned novel features, the technology also demonstrates certain attributes which are regarded as non-obvious inventive steps like as follows:

1. The configurational flexibility of integrating three energy sources of distinct characteristics and both traction load and auxiliary loads of an electrified vehicle through dedicated dc ports in a single unified platform.
2. The distinct operating modes of the non-isolated multiport converter depending upon the dynamic load power scenarios corresponding to steady speed operation, acceleration and regenerative braking of the electrified vehicle to achieve a diverse range of flexibility in power management among the multiple energy sources and multiple loads.
3. The distinct operating modes of the non-isolated multiport converter for flexibly allocating the battery and ultracapacitor to deliver the load power or to recuperate the regenerative power utilizing either of the inductors.
4. The distinct operating modes of the non-isolated multiport converter for flexibly allocating the fuel cell for charging the battery or the ultracapacitor in either of buck (step down) or boost (step up) mode, depending upon the voltage ratings of the respective energy sources.
5. The distinct operating modes of the non-isolated multiport converter for flexibly engaging the battery for charging the ultracapacitor in either of the buck or boost mode depending upon the voltage ratings of both the energy sources.
6. The operating mode of the non-isolated multiport converter for supplying the auxiliary loads uninterruptedly through the dedicated dc output port regardless of the power transfer scenarios between input energy sources and traction load.
7. The operating mode of the non-isolated multiport converter for supplying the auxiliary load in buck mode while the traction load is supplied in boost mode simultaneously utilizing the same inductor.

Other features and advantages of the invention will be apparent from the following description provided in the present disclosure.

BRIEF DESCRIPTION OF THE DRAWINGS

FIGS. 3a and 3b each represents another embodiment of the technology described herein corresponding to the operation of the non-isolated multiport dc-dc converter.

FIGS. 4a and 4b each represents another embodiment of the technology described herein corresponding to the operation of the non-isolated multiport dc-dc converter.

FIGS. 5a and 5b each represents another embodiment of the technology described herein corresponding to the operation of the non-isolated multiport dc-dc converter.

DETAILED DESCRIPTION

Figure 1:
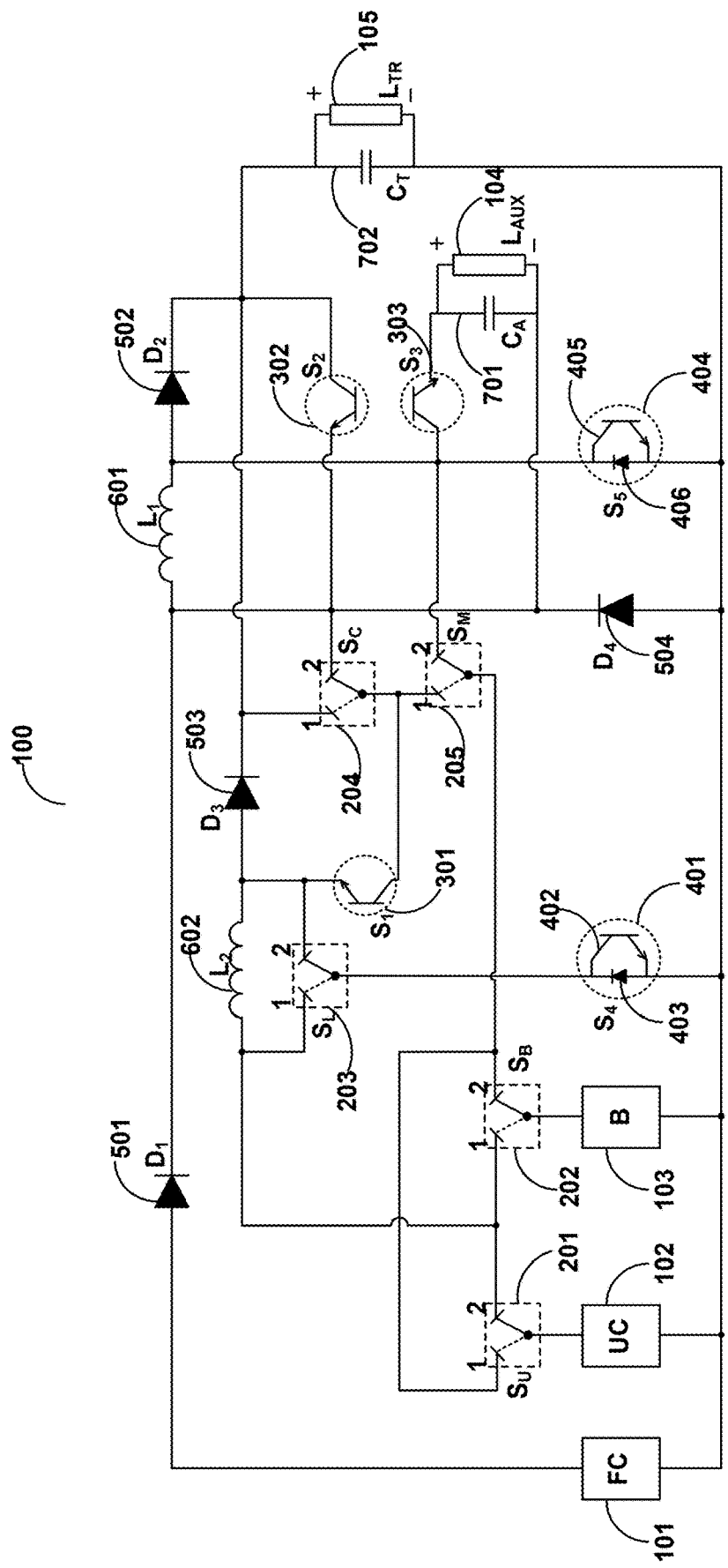
FIG. 1 is a schematic representation of a non-isolated multiport dc-dc converter.

The technology described herein is illustrated in FIGS. 1 to 10 of the drawing(s) accompanying this specification. In the drawings like reference numbers/letters indicate corresponding parts in the various figures. The abbreviations of various components used for describing the figures are enumerated in Table 1.

TABLE 1

| Abbreviations | Description |
| --- | --- |
| FC | Fuel cell stack |
| B | Battery pack |
| UC | Ultracapacitor module |
| $S_1$ | First high frequency unidirectional switch |
| $S_2$ | Second high frequency unidirectional switch |
| $S_3$ | Third high frequency unidirectional switch |
| $S_4$ | First high frequency bidirectional switch |
| $S_5$ | Second high frequency bidirectional switch |
| $S_U$ | First low frequency bidirectional switch |
| $S_B$ | Second low frequency bidirectional switch |
| $S_L$ | Third low frequency bidirectional switch |
| $S_C$ | Fourth low frequency bidirectional switch |
| $S_M$ | Fifth low frequency bidirectional switch |
| $L_1$ | First Inductor |
| $L_2$ | Second Inductor |
| $D_1$ | First power diode |
| $D_2$ | Second power diode |
| $D_3$ | Third power diode |
| $D_4$ | Fourth power diode |
| $C_A$ | Auxiliary load dc capacitor module |
| $C_T$ | Traction load dc capacitor module |
| $L_{AUX}$ | Auxiliary load(s) |
| $L_{TR}$ | Traction load |

FIG. 1 represents a schematic of the non-isolated multiport dc-dc converter (100) configuration comprising of five dc ports among which three dc ports are dedicated for interfacing fuel cell (101), ultracapacitor (102) and battery (103) respectively and two separate dc load ports for interfacing auxiliary loads (104) and traction load (105) respectively. The non-isolated multiport dc-dc converter (100) further comprises of five numbers of low frequency bidirectional switches designated as $S_U$ (201), $S_B$ (202), $S_L$ (203), $S_C$ (204) and $S_M$ (205); three numbers of high frequency unidirectional (transistor) switches designated as $S_1$ (301), $S_2$ (302), $S_3$ (303); two numbers of high frequency bidirectional switches $S_4$ (401) consisting of a transistor (402) with an anti-parallel body diode (403) and $S_5$ (404) consisting of a transistor (405) with an anti-parallel body diode (406); four numbers of power diodes designated as $D_1$(501), $D_2$(502), $D_3$(503), $D_4$(504); two numbers of inductors $L_1$(601) and $L_2$(602); two numbers of dc capacitor modules $C_A$ (701) and $C_T$ (702) across the dc load ports dedicated for auxiliary loads $L_{AUX}$ (104) and traction load $L_{TR}$ (105) respectively. The high frequency bidirectional switches $S_4$ (401) and $S_5$ (404) are controlled by providing a pulse width modulated (PWM) signal of a desired duty cycle for a desired period by periodically switching on or off the respective transistors (402) and (405) in order to periodically energize or de-energize either of the inductors $L_1$ (601) and $L_2$ (602) depending upon the operating mode. The high frequency unidirectional switches $S_1$ (301), $S_2$ (302) and $S_3$ (303) can be either controlled by providing a PWM signal of a desired duty cycle for a desired period by periodically switching on or off the respective transistors, or by providing a continuous signal to either switch on or off the respective transistors for the entire duration of the operation. The low frequency bidirectional switches ($S_U$ (201), $S_B$ (202), $S_L$ (203), $S_C$ (204) and $S_M$ (205)) can be selectively coupled to either first position (position 1) or second position (position 2) by providing an activation signal depending upon the desired operating mode in order to create an electrical power flow path therethrough. Each of the power diodes $D_1$(501), $D_2$(502), $D_3$(503) and $D_4$(504) facilitates unidirectional flow of electrical power through any path of the circuit during forward conducting condition and restricts the bidirectional flow of power under reverse blocking condition. Each of the operating modes of the non-isolated multiport dc-dc converter (100) is characterized by either boost mode power transfer when the flow of power is from any of the energy sources to the traction load (105) or as buck mode when the flow of power is from the traction load (105) to the energy sources or in either of the buck or boost mode during inter transfer of charging power in between the fuel cell (101), ultracapacitor (102) and battery (103).

The power flow paths constituting all the components of the non-isolated multiport dc-dc converter (100) which are actively functioning and responsible for conduction of electrical power during the respective operation are represented through solid lines (-) whereas the other remaining non-functioning and non-conducting components are represented through dashed lines (- - - -) for the FIGS. 2 to 10.

Figure 2:
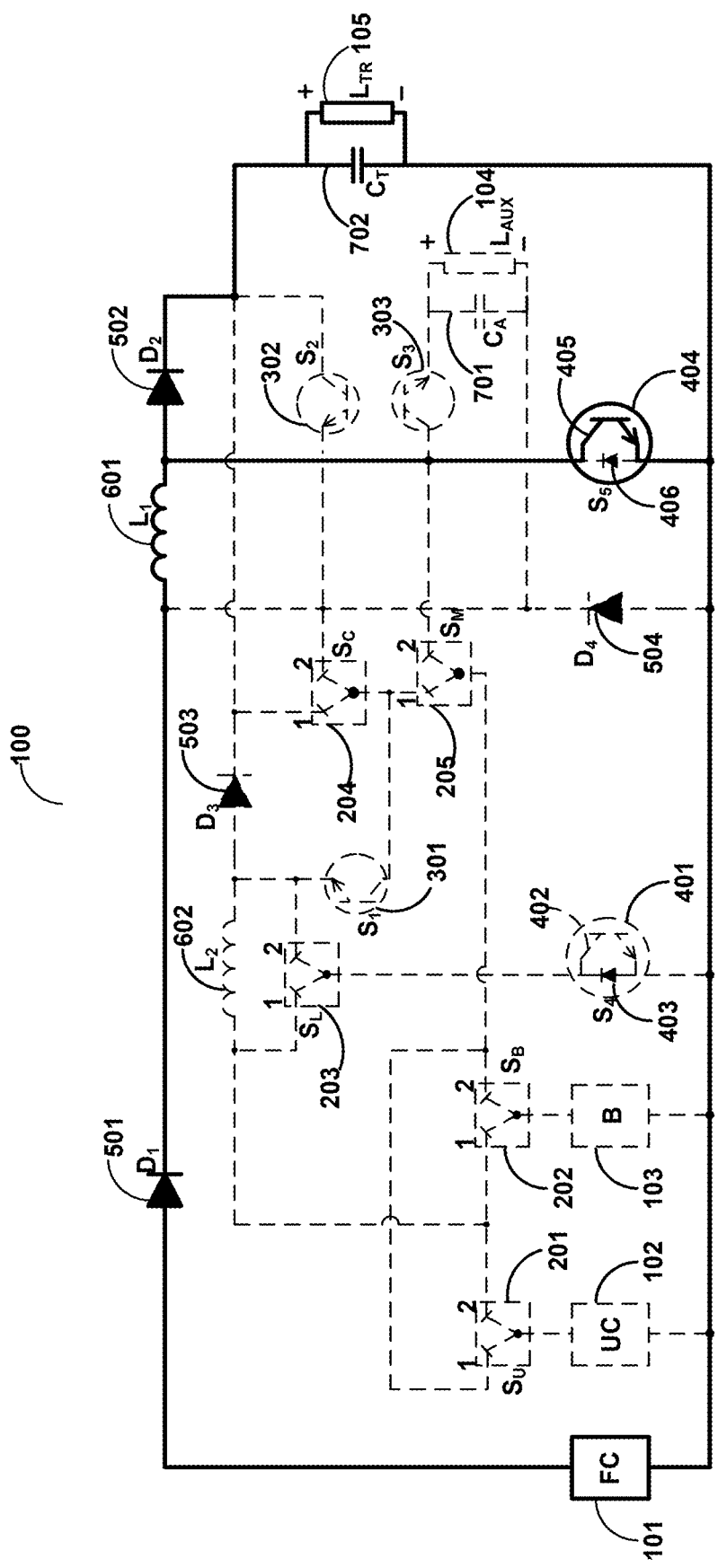
FIG. 2 represents an embodiment of the technology described herein corresponding to the operation of the non-isolated multiport dc-dc converter.

FIG. 2 represents an embodiment of the technology described herein corresponding to the operation of the non-isolated multiport dc-dc converter (100) while delivering power to the traction load (105) from the fuel cell (101) in boost mode. A PWM signal is provided to the switch $S_5$(404) for a specified period and a duty cycle for periodically switching on and off the transistor (405) in order to periodically energize and de-energize the inductor $L_1$ (601).

FIG. 3a represents another embodiment of the technology described herein corresponding to the operation of the non-isolated multiport dc-dc converter (100) while delivering power to the traction load (105) from the battery (103) in boost mode by utilizing the inductor $L_1$ (601). A PWM signal is provided to the switch $S_5$ (404) for a specified period and a duty cycle for periodically switching on and off the transistor (405) in order to periodically energize and de-energize $L_1$ (601) and activation signals are provided to the switches $S_B$ (202) and $S_C$ (204) to couple at position 2 and to the switch $S_M$ (205) to couple at position 1 in order to create the desired electrical power flow paths.

FIG. 3b represents another embodiment of the technology described herein corresponding to the operation of the non-isolated multiport dc-dc converter (100) while delivering power to the traction load (105) from the battery (103) in boost mode by utilizing the inductor $L_2$ (602). A PWM signal is provided to the switch $S_4$ (401) for a specified period and a duty cycle for periodically switching on and off the transistor (402) in order to periodically energize and de-energize $L_2$ (602) and activation signals are provided to the switch $S_B$ (202) to couple at position 1 and to the switch $S_L$ (203) to couple at position 2 in order to create the desired electrical power flow paths.

FIG. 4a represents another embodiment of the technology described herein corresponding to the operation of the non-isolated multiport dc-dc converter (100) while delivering power to the traction load (105) from the ultracapacitor (102) in boost mode by utilizing the inductor $L_1$ (601). A PWM signal is provided to the switch $S_5$ (404) for a specified period and with a specified duty cycle for periodically switching on and off the transistor (405) in order to periodically energize and de-energize $L_1$ (601) and activation signals are provided to the switches $S_U$ (201) and SM (205) respectively to couple at position 1 and to the switch $S_C$ (204) to couple at position 2 in order to create the desired electrical power flow paths.

FIG. 4b represents another embodiment of the technology described herein corresponding to the operation of the non-isolated multiport dc-dc converter (100) while delivering power to the traction load (105) from the ultracapacitor (102) in boost mode by utilizing the inductor $L_2$ (602). A PWM signal is provided to the switch $S_4$ (401) for a specified period and a duty cycle for periodically switching on and off the transistor (402) in order to periodically energize and de-energize $L_2$ (602) and activation signals are provided to the switches $S_U$ (201) and $S_L$ (203) respectively to couple at position 2 in order to create the desired electrical power flow paths.

FIG. 5a represents another embodiment of the technology described herein corresponding to the operation of the non-isolated multiport dc-dc converter (100) while charging the ultracapacitor (102) from the fuel cell (101) in boost mode. A PWM signal is provided to the switch $S_4$ (401) for a specified period and a duty cycle for periodically switching on and off the transistor (402) in order to periodically energize and de-energize $L_2$ (602) while activation signals are provided to the switches $S_U$ (201) and $S_C$ (204) respectively to couple at position 2 and to the switch SL(203) to couple at position 1 and a continuous ON signal is provided to the transistor of the switch $S_1$(301) in order to create the desired electrical power flow paths.

FIG. 5b represents another embodiment of the technology described herein corresponding to the operation of the non-isolated multiport dc-dc converter (100) while charging the ultracapacitor (102) from the fuel cell (101) in buck mode. A PWM signal is provided to the switch $S_1$ (301) for a specified period and a duty cycle for periodically switching on and off the transistor in order to periodically energize and de-energize the inductor $L_2$ (602) while activation signals are provided to the switches $S_U$(201), $S_L$ (203) and $S_C$ (204) respectively to couple at position 2 in order to create the desired electrical power flow paths. The body diode (403) of the switch $S_4$ (401) conducts during this mode to facilitate the flow of electrical power.

Figure 6B:
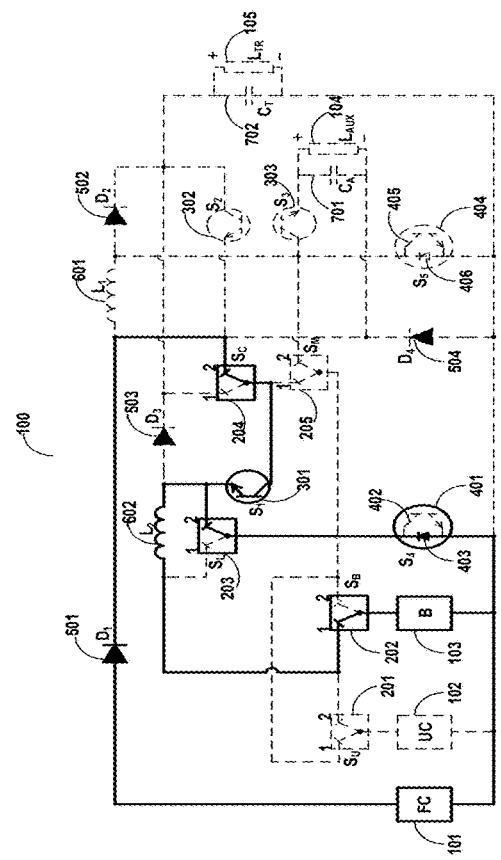
FIGS. 6a and 6b each represents another embodiment of the technology described herein corresponding to the operation of the non-isolated multiport dc-dc converter.
Figure 6A:
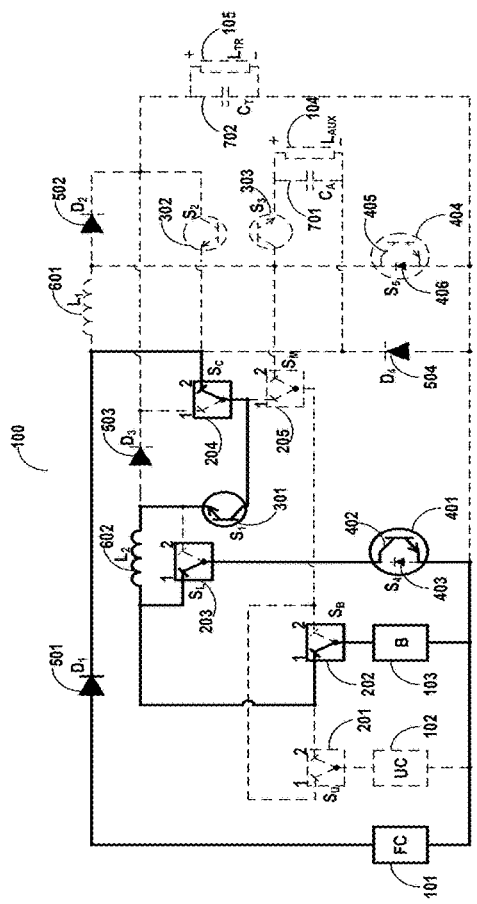

FIG. 6a represents another embodiment of the technology described herein corresponding to the operation of the non-isolated multiport dc-dc converter (100) while charging the battery (103) from the fuel cell (101) in boost mode. A PWM signal is provided to the switch $S_4$ (401) for a specified period and a duty cycle for periodically switching on and off the transistor (402) in order to periodically energize and de-energize $L_2$ (602) while activation signals are provided to switches $S_B$ (202) and $S_L$ (203) respectively to couple at position 1 and to the switch $S_C$ (204) to couple at position 2 and a continuous signal is provided to the transistor of switch $S_1$(301) in order to create the desired electrical power flow paths.

FIG. 6b represents another embodiment of the technology described herein corresponding to the operation of the non-isolated multiport dc-dc converter (100) while charging the battery (103) from the fuel cell (101) in buck mode. A PWM signal is provided to the switch $S_1$ (301) for a specified period and a duty cycle for periodically switching on and off the transistor in order to periodically energize and de-energize $L_2$ (602) while activation signals are provided to the switch $S_B$ (202) to couple at position 1 and to the switches $S_L$ (203) and $S_C$ (204) to couple at position 2 in order to create the desired electrical power flow paths. The body diode (403) of the switch $S_4$ (401) conducts during this mode to facilitate the flow of electrical power.

Figure 7B:
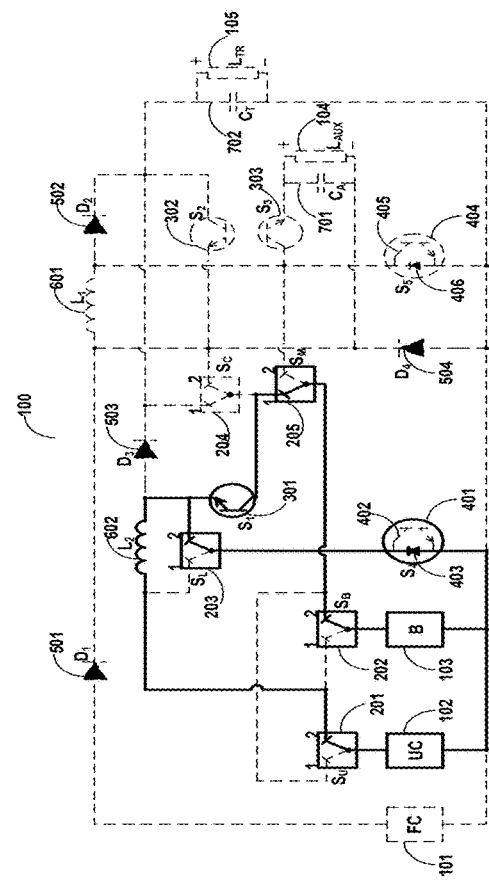
FIGS. 7a and 7b each represents another embodiment of the technology described herein corresponding to the operation of the non-isolated multiport dc-dc converter.
Figure 7A:
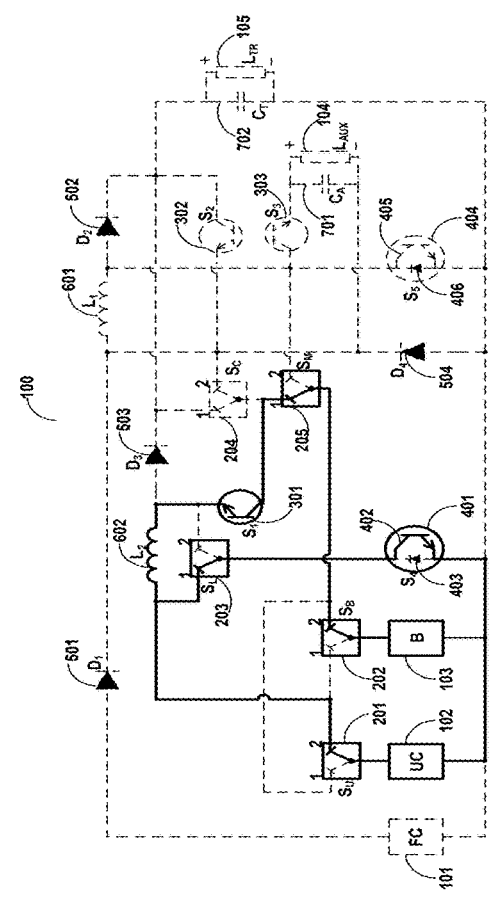

FIG. 7a represents another embodiment of the technology described herein corresponding to the operation of the non-isolated multiport dc-dc converter (100) while charging the ultracapacitor (102) from the battery (103) in boost mode. A PWM signal is provided to the switch $S_4$ (401) for a specified period and a duty cycle for periodically switching on and off the transistor (402) in order to periodically energize and de-energize $L_2$ (602) while activation signals are provided to the switches $S_U$(201) and $S_B$ (202) to couple at position 2 and the switches SL (203) and SM(205) to couple at position 1 and a continuous signal is provided to the transistor of the switch $S_1$(301) in order to create the desired electrical power flow paths.

FIG. 7b represents another embodiment of the technology described herein corresponding to the operation of the non-isolated multiport dc-dc converter (100) while charging the ultracapacitor (102) from the battery (103) in buck mode. A PWM signal is provided to the switch $S_1$ (301) for a specified period and a duty cycle for periodically switching on and off the transistor in order to periodically energize and de-energize $L_2$ (602) while activation signals are provided to the switch $S_M$ (205) to couple at position 1 and the switches $S_U$ (201), $S_B$ (202) and $S_L$ (203) respectively to couple at position 2 in order to create the desired electrical power flow paths. The body diode (403) of the switch $S_4$ (401) conducts during this mode to facilitate the flow of electrical power.

Figure 8A:
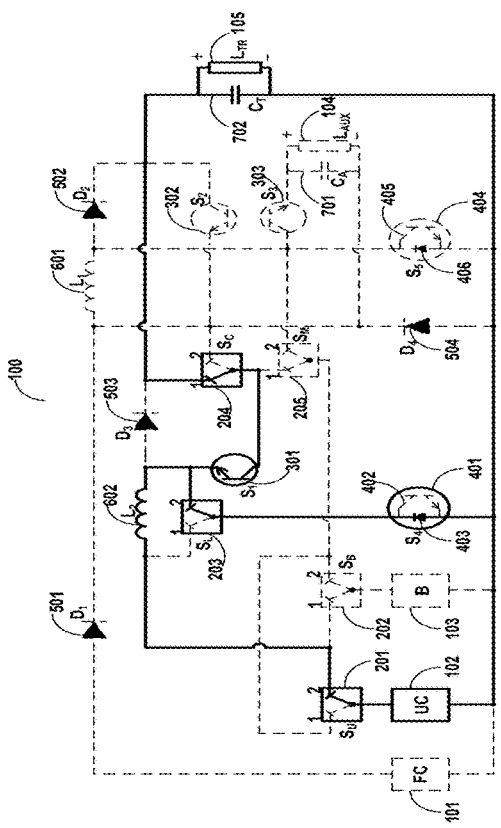
FIGS. 8a and 8b each represents another embodiment of the technology described herein corresponding to the operation of the non-isolated multiport dc-dc converter.

FIG. 8a represents another embodiment of the technology described herein corresponding to the operation of the non-isolated multiport dc-dc converter (100) while recuperating regenerative power from the traction load (105) in to the ultracapacitor (102) in buck mode by utilizing the inductor $L_1$(601). A PWM signal is provided to the $S_2$ (302) for a specified period and a duty cycle for periodically switching on and off the transistor in order to periodically energize and de-energize $L_1$ (601) and activation signals are provided to the $S_U$ (201) to couple at position 1 and the $S_M$ (205) to couple at position 2 in order to create the desired electrical power flow paths.

Figure 8B:
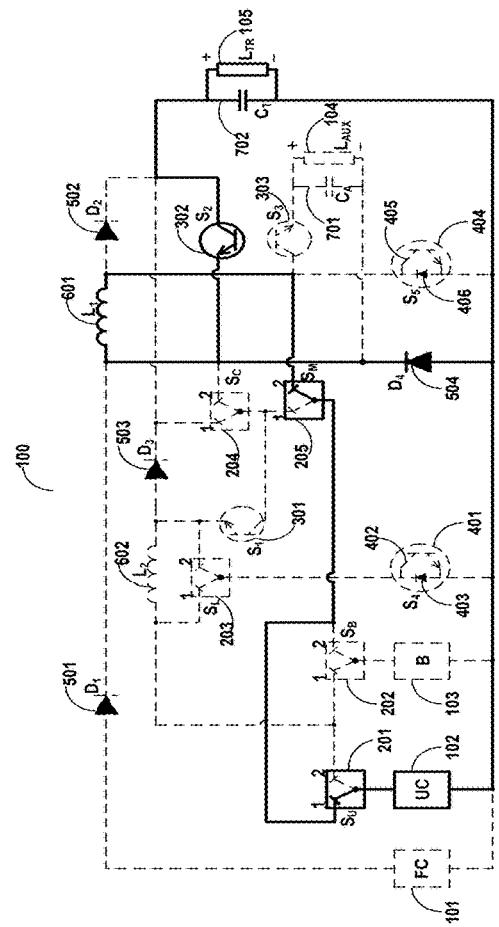

FIG. 8b represents another embodiment of the technology described herein corresponding to the operation of the non-isolated multiport dc-dc converter (100) while recuperating regenerative power from the traction load (105) in to the ultracapacitor (102) in buck mode by utilizing the inductor $L_2$ (602). A PWM signal is provided to the switch $S_1$ (301) for a specified period and a duty cycle for periodically switching on and off the transistor in order to periodically energize and de-energize $L_2$ (602) and activation signals are provided to the switch $S_C$(204) to couple at position 1 and the switches $S_U$ (201) and $S_L$ (203) respectively to couple at position 2 in order to create the desired electrical power flow paths. The body diode (403) of the switch $S_4$ (401) conducts during this mode to facilitate the flow of electrical power.

Figure 9B:
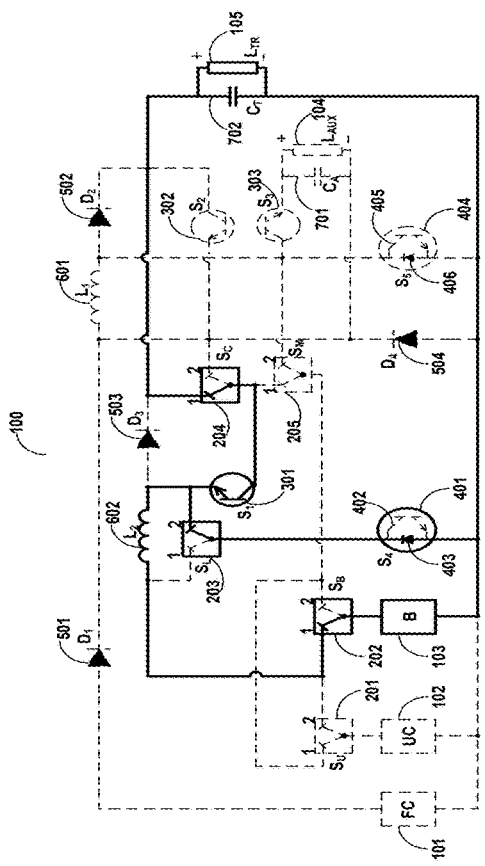
FIGS. 9a and 9b each represents another embodiment of the technology described herein corresponding to the operation of the non-isolated multiport dc-dc converter.
Figure 9A:
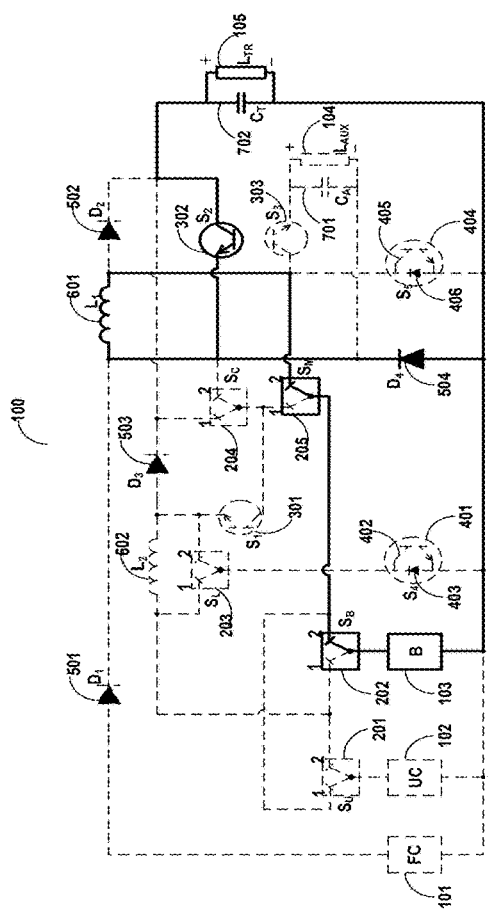

FIG. 9a represents another embodiment of the technology described herein corresponding to the operation of the non-isolated multiport dc-dc converter (100) while recuperating regenerative power from the traction load (105) in to the battery (103) in buck mode by utilizing the inductor $L_1$(601). A PWM signal is provided to the switch $S_2$ (302) for a specified period and a duty cycle for periodically switching on and off the transistor in order to periodically energize and de-energize $L_1$ (601) and activation signals are provided to the switches $S_B$ (202) and $S_M$ (205) to couple at position 2 in order to create the desired electrical power flow paths.

FIG. 9b represents another embodiment of the technology described herein corresponding to the operation of the non-isolated multiport dc-dc converter (100) while recuperating regenerative power from the traction load (105) in to the battery (103) in buck mode by utilizing the inductor $L_2$ (602). A PWM signal is provided to the switch $S_1$ (301) for a specified period and a duty cycle for periodically switching on and off the transistor in order to periodically energize and de-energize $L_2$ (602) and activation signals are provided to the switches $S_C$ (204) and $S_B$ (202) respectively to couple at position 1 and the switch $S_L$ (203) to couple at position 2 in order to create the desired electrical power flow paths. The body diode (403) of the switch $S_4$ (401) conducts during this mode to facilitate the flow of electrical power.

Figure 10:
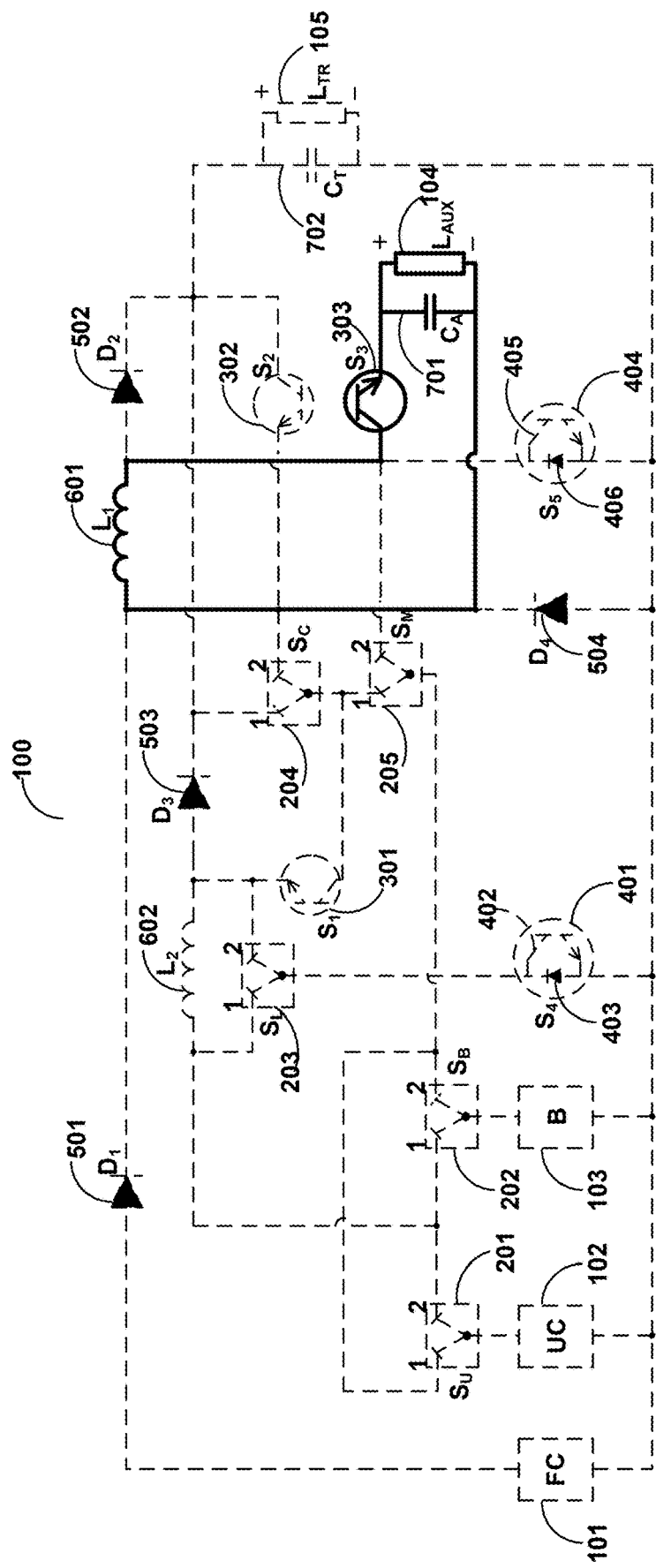
FIG. 10 represents another embodiment of the technology described herein corresponding to the operation of the non-isolated multiport dc-dc converter.

FIG. 10 represents another embodiment of the technology described herein corresponding to the operation of the non-isolated multiport dc-dc converter (100) while continually supplying power to the auxiliary load (104) from either of the energy sources or from traction load (105) during regeneration in buck mode by utilizing the inductor $L_1$ (601). A PWM signal is provided to the switch $S_3$ (301) for a specified period and a duty cycle for periodically switching on and off the transistor in order to periodically energize and de-energize $L_1$ (601).

Figure 11:
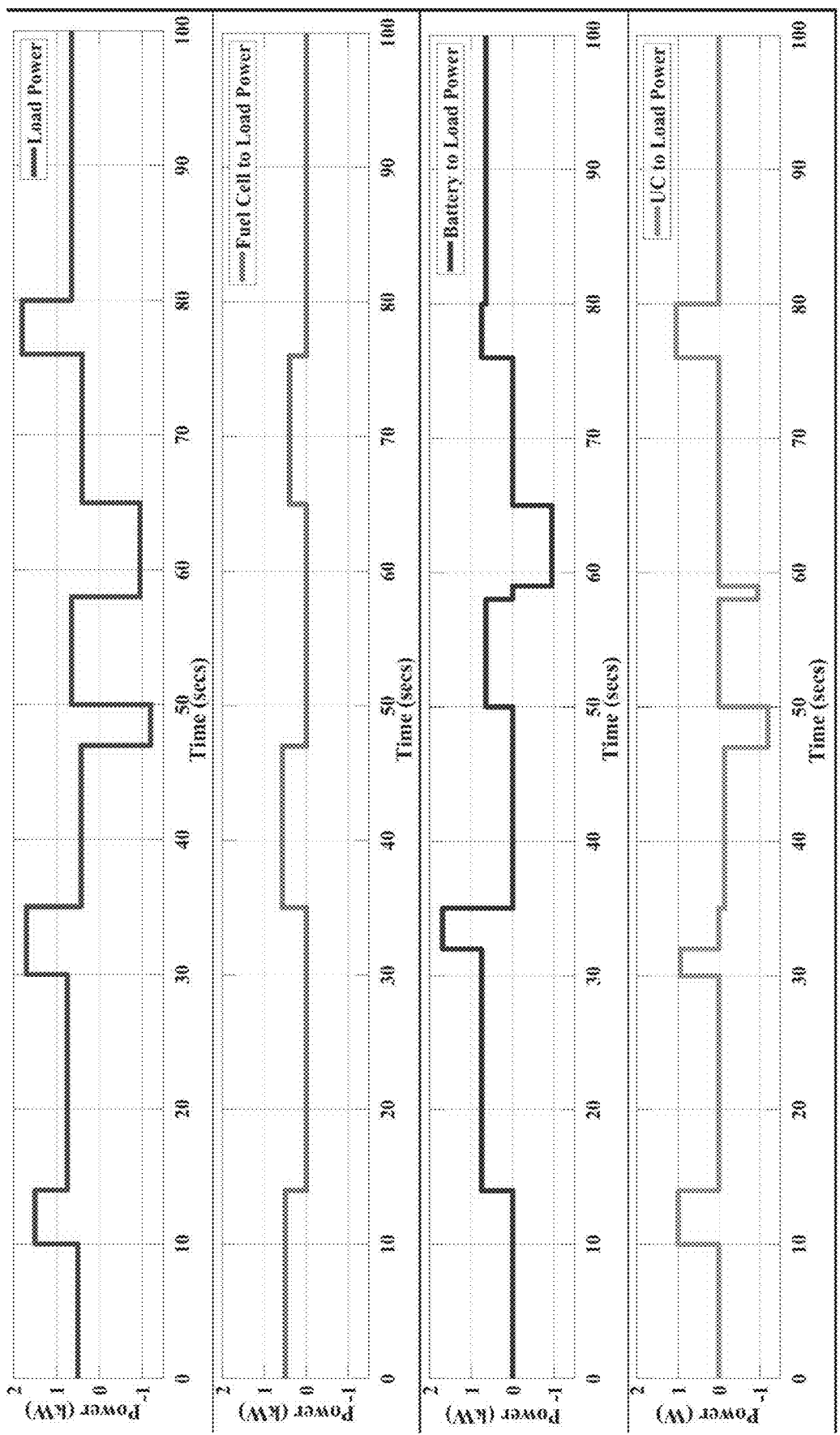
FIG. 11 represents a typical load power profile corresponding to the operation of the non-isolated multiport dc-dc converter.

FIG. 11 represents a typical load power profile corresponding to the operation of the non-isolated multiport dc-dc converter (100) showcasing the sharing of power between fuel cell (101), ultracapacitor (102), battery (103) and traction load (105) during different operating modes.

Accordingly the technology described herein provides a Non-Isolated Multiport DC-DC Converter to Integrate Multiple Energy Sources for Electrified Vehicles which comprises three separate dc ports configured as source ports dedicated for interfacing fuel cell, battery and ultracapacitor, respectively; two separate dc ports configured as load ports dedicated for interfacing traction load and auxiliary loads respectively; three numbers of high frequency unidirectional switches, two numbers of high frequency bidirectional switches, five numbers of low frequency bidirectional switches, four numbers of power diodes, two numbers of inductors and two numbers of capacitors wherein; the high frequency unidirectional switches are selectively controlled by a pulse width modulated signal or a continuous signal depending upon the operating mode; the high frequency bidirectional switches are controlled by a pulse width modulated signal to ensure transfer of power in boost and buck mode according to the desired operation; the low frequency bidirectional switches are controlled by providing activation signals to selectively couple at first position or second position, according to the operating mode, in order to establish an electrical power flow path for facilitating the desired flow of electrical current; the power diodes ensures an unidirectional flow of power and prevents the undesirable reverse flow of power during each power transfer scenario; the inductors are periodically energized and de-energized depending upon the control signal of the high frequency switches to accomplish power transfer in boost and buck mode; the capacitors are positioned at the dc load ports to filter out the undesirable ripple components from the generated dc voltage at the load ports.

In an embodiment of the technology described herein with reference to the FIG. 2, an operating mode of the non-isolated multiport converter (100) is provided for delivering power to the traction load (105) from the fuel cell (101) in boost mode. The mode comprises of providing a PWM signal to the switch $S_5$ (404) for a specified period and a duty cycle corresponding to the step up voltage level in order to periodically energize and de-energize the inductor $L_1$ (601). The power flow paths corresponding to energizing and de-energizing of $L_1$ (601) is as shown below;

FC-$D_1$-$L_1$-$S_5$ ($L_1$ energizing during $S_5$ ON period)
FC-$D_1$-$L_1$-$D_2$-$C_T$-$L_{TR}$ ($L_1$ de-energizing during $S_5$ OFF period).

In another embodiment of the technology described herein with reference to the FIG. 3a and FIG. 3b, two distinct operating modes of the non-isolated multiport converter (100) are provided for delivering power to the traction load (105) from the battery (103) in boost mode. The operation can be accomplished through two distinct modes. The first operating mode comprises of providing a PWM signal to the high frequency bidirectional switch $S_5$ (404) for a specified period and a duty cycle corresponding to the step up voltage level in order to periodically energize and de-energize $L_1$ (601), while activation signals are provided to the switches $S_B$ (202), $S_M$ (205) and $S_C$ (204) respectively to couple at the desired positions for closure of the electrical power flow paths. Accordingly, the power flow paths corresponding to energizing and de-energizing of $L_1$ (601) with the position of coupling of the low frequency bidirectional switches (202, 204, 205) are illustrated in FIG. 3a and are stated below;

B-$S_B$(2)-$S_M$(1)-$S_C$(2)-$L_1$-$S_5$ ($L_1$ energizing during $S_5$ ON period)
B-$S_B$ (2)-$S_M$ (1)-$S_C$ (2)-$L_1$-$D_2$-$C_T$-$L_{TR}$ ($L_1$ de-energizing during $S_5$ OFF period).

The second operating mode comprises of providing a PWM signal to the high frequency bidirectional switch $S_4$ (401) for a specified period and a duty cycle corresponding to the step up voltage level in order to periodically energize and de-energize the inductor $L_2$ (602) while activation signals are provided to the low frequency bidirectional switches $S_B$ (202) and $S_L$ (203) respectively to couple at the desired positions for closure of the electrical power flow paths. Accordingly, the power flow paths corresponding to energizing and de-energizing of $L_2$ (602) with the position of coupling of the low frequency bidirectional switches (202 and 203) are illustrated in FIG. 3b and are stated below;

B-$S_B$ (1)-$L_2$-$S_L$ (2)-$S_4$ ($L_2$ energizing during $S_4$ ON period)

B-$S_B$ (1)-$L_2$-$D_3$-$C_T$-$L_{TR}$ ($L_2$ de-energizing during $S_4$ OFF period)

In yet another embodiment of the technology described herein with reference to the FIG. 4a and FIG. 4b, two distinct operating modes of the non-isolated multiport converter (100) are provided for delivering power to the traction load (105) from the ultracapacitor (102) in boost mode. The operation can be accomplished through two distinct modes. The first operating mode comprises of providing a PWM signal to the switch $S_5$ (404) for a specified period and a duty cycle corresponding to the step up voltage level in order to periodically energize and de-energize $L_1$ (601) while activation signals are provided to the switches $S_U$ (201), $S_M$ (205) and $S_C$ (204) respectively to couple at the desired positions for closure of the electrical power flow paths. Accordingly, the power flow paths corresponding to energizing and de-energizing of $L_1$ (601) with the position of coupling of the low frequency bidirectional switches (201, 204 and 205) are illustrated in FIG. 4a and are stated below;

UC-$S_U$ (1)-$S_M$ (1)-$S_C$ (2)-$L_1$-$S_5$ ($L_1$ energizing during $S_5$ ON period)

UC-$S_U$ (1)-$S_M$ (1)-$S_C$ (2)-$L_1$-$D_2$-$C_T$-$L_{TR}$ ($L_1$ de-energizing during $S_5$ OFF period).

The second operating mode comprises of providing a PWM signal to the switch $S_4$ (401) for a specified period and a duty cycle corresponding to the step up voltage level in order to periodically energize and de-energize the inductor $L_2$ (602) while activation signals are provided to the switches $S_U$ (201) and $S_L$ (203) respectively to couple at the desired positions for facilitating the desired flow of power. Accordingly, the power flow paths corresponding to energizing and de-energizing of $L_2$ (602) with the position of coupling of the low frequency bidirectional switches (201 and 203) are illustrated in FIG. 4b and is stated below;

UC-$S_U$ (2)-$L_2$-$S_L$ (2)-$S_4$ ($L_2$ energizing during $S_4$ ON period)

UC-$S_U$ (2)-$L_2$-$S_L$ (2)-$D_3$-$C_T$-$L_{TR}$ ($L_2$ de-energizing during $S_4$ OFF period)

In still another embodiment of the technology described herein with reference to the FIGS. 5a and 5b, two distinct operating modes of the non-isolated multiport converter (100) are provided for charging the ultracapacitor (102) from the fuel cell (101) in either boost or buck mode depending upon the voltage ratings of the individual energy sources (101 and 102). During boost mode charging, a PWM signal of a specified period and a duty cycle corresponding to the step up voltage level is provided to the switch $S_4$ (401) in order to periodically energize and de-energize $L_2$ (602) while activation signals are provided to the switches $S_C$ (204), $S_L$ (203) and $S_U$ (201) respectively to couple at the desired positions and a continuous ON signal is provided to the switch $S_1$ (301) for facilitating the desired flow of power. Accordingly, the power flow paths corresponding to energizing and de-energizing of $L_2$ (602) with the position of coupling of the low frequency bidirectional switches (201, 203, 204) are illustrated in FIG. 5a and is stated below;

FC-$D_1$-$S_C$ (2)-$S_1$-$L_2$-$S_L$ (1)-$S_4$ ($L_2$ energizing during $S_4$ ON period)

FC-$D_1$-$S_C$ (2)-$S_1$-$L_2$-$S_U$ (2)-UC ($L_2$ de-energizing during $S_4$ OFF period)

During buck mode charging, a PWM signal of a specified period and a duty cycle corresponding to the step down voltage level is provided to the switch $S_1$ (301) in order to periodically energize and de-energize $L_2$ (602) while activation signals are provided to the switches $S_C$ (204), $S_U$ (201), and $S_L$ (203) respectively to couple at the desired positions for facilitating the desired flow of power. Accordingly, the power flow paths corresponding to energizing and de-energizing of $L_2$ (602) with the position of coupling of the low frequency bidirectional switches (201, 203 and 204) are illustrated in FIG. 5b and is stated below;

FC-$D_1$-$S_C$ (2)-$S_1$-$L_2$-$S_U$ (2)-UC ($L_2$ energizing during $S_1$ ON period)

$L_2$-$S_U$ (2)-UC-$S_4$ (body diode)-$S_L$ (2) ($L_2$ de-energizing during $S_1$ OFF period)

In yet another embodiment of the technology described herein with reference to the FIGS. 6a and 6b, two distinct operating modes of the non-isolated multiport converter (100) are provided for charging the battery (103) from the fuel cell (101) in either boost or buck mode depending upon the voltage ratings of the individual energy sources (101 and 103). During boost mode charging, a PWM signal of a specified period and a duty cycle corresponding to the step up voltage level, is provided to the switch $S_4$ (401) in order to periodically energize and de-energize $L_2$ (602) while activation signals are provided to the switches $S_C$ (204), $S_L$ (203) and $S_B$ (202) respectively to couple at the desired positions and a continuous ON signal is provided to the switch $S_1$ (301) for facilitating the desired flow of power. Accordingly, the power flow paths corresponding to energizing and de-energizing of $L_2$ (602) with the position of coupling of the low frequency bidirectional switches (202, 203 and 204) are illustrated in FIG. 6a and are stated below;

FC-$D_1$-$S_C$ (2)-$S_1$-$L_2$-$S_L$ (1)-$S_4$ ($L_2$ energizing during $S_4$ ON period)

FC-$D_1$-$S_C$ (2)-$S_1$-$L_2$-$S_B$ (1)-B ($L_2$ de-energizing during $S_4$ OFF period).

During buck mode of charging, a PWM signal of a specified period and a duty cycle corresponding to the step down voltage level is provided to the switch $S_1$ (301) in order to periodically energize and de-energize $L_2$ (602) while activation signals are provided to the switches $S_C$ (204), $S_B$ (202), and $S_L$ (203) respectively to couple at the desired positions for facilitating the desired flow of power. Accordingly, the power flow paths corresponding to energizing and de-energizing of $L_2$ (602) with the position of coupling of the low frequency bidirectional switches (202, 203 and 204) are illustrated in FIG. 6b and are stated below;

FC-$D_1$-$S_C$ (2)-$S_1$-$L_2$-$S_B$ (1)-B ($L_2$ energizing during $S_1$ ON period)

$L_2$-$S_B$ (1)-B-$S_4$ (body diode)-$S_L$ (2) ($L_2$ de-energizing during $S_1$ OFF period).

In still another embodiment of the technology described herein with reference to the FIGS. 7a and 7b, two distinct operating modes of the non-isolated multiport converter (100) are provided for charging the ultracapacitor (102) from the battery (103) in either boost or buck mode depending upon the voltage ratings of the individual energy sources (102 and 103). During boost mode charging, a PWM signal of a specified period and a duty cycle corresponding to the step up voltage level is provided to the switch $S_4$ (401) in order to periodically energize and de-energize $L_2$ (602) while activation signals are provided to the switches $S_B$ (202), SM (205), $S_L$ (203) and $S_U$ (201) respectively to couple at the desired positions and a continuous ON signal is provided to the switch $S_1$ (301) for facilitating the desired flow of power. Accordingly, the power flow paths corresponding to energizing and de-energizing of $L_2$ (602) with the position of coupling of the low frequency bidirectional switches (201, 202, 203 and 205) are illustrated in FIG. 7a and is stated below;

B-$S_B$ (2)-$S_M$ (1)-$S_1$-$L_2$-$S_L$ (1)-$S_4$ ($L_2$ energizing during $S_4$ ON period)

B-$S_B$ (2)-$S_M$ (1)-$S_1$-$L_2$-$S_U$ (2)-UC ($L_2$ de-energizing during $S_4$ OFF period)

During buck mode charging, a PWM signal of a specified period and a duty cycle corresponding to the step down voltage level is provided to the switch $S_1$ (301) in order to periodically energize and de-energize $L_2$ (602) while activation signals are provided to the low frequency bidirectional switches $S_B$ (202), $S_M$ (205), $S_U$ (201), and $S_L$ (203) respectively to couple at the desired positions for facilitating the desired flow of power. Accordingly, the power flow paths corresponding to energizing and de-energizing of $L_2$ (602) with the position of coupling of the low frequency bidirectional switches (201, 202, 203 and 205) are illustrated in FIG. 7b and are stated below;

B-$S_B$ (2)-$S_M$ (1)-$S_1$-$L_2$-$S_U$ (2)-UC ($L_2$ energizing during $S_1$ ON period)

$L_2$-$S_U$ (2)-UC-$S_4$ (body diode)-$S_L$ (2) ($L_2$ de-energizing during $S_1$ OFF period)

In yet another embodiment of the technology described herein with reference to the FIGS. 8a and 8b, two distinct operating modes of the non-isolated multiport converter (100) are provided for recuperating regenerative power from the traction load (105) to the ultracapacitor (102) in buck mode. The operation can be accomplished through two distinct modes. The first operating mode comprises of providing a PWM signal to the high frequency bidirectional switch $S_2$ (302) for a specified period and a duty cycle corresponding to the step down voltage level in order to periodically energize and de-energize $L_1$ (601) and activation signals are provided to the switches $S_M$ (205) and $S_U$ (201) to couple at the desired positions for facilitating the desired flow of power. Accordingly, the power flow paths corresponding to energizing and de-energizing of $L_1$ (601) with the position of coupling of the low frequency bidirectional switches (201 and 205) are illustrated in FIG. 8a and is stated below;

$L_{TR}$-$C_T$-$S_2$-$L_1$-$S_M$(2)-$S_U$(1)-UC ($L_1$ energizing during $S_2$ ON period)

$L_1$-$S_M$(2)-$S_U$(1)-UC-$D_4$ ($L_1$ de-energizing during $S_2$ OFF period)

The second operating mode comprises of providing a PWM signal to the switch $S_1$ (301) for a specified period and a duty cycle corresponding to the step down voltage level in order to periodically energize and de-energize the inductor $L_2$ (602) and activation signals are provided to the switches $S_C$ (204), $S_U$ (201) and $S_L$ (203) respectively to couple at the desired positions for facilitating the desired flow of power. Accordingly, the power flow paths corresponding to energizing and de-energizing of $L_2$ (602) with the position of coupling of the low frequency bidirectional switches (201, 203 and 204) are illustrated in FIG. 8b and is stated below;

$L_{TR}$-$C_T$-$S_C$ (1)-$S_1$-$L_2$-$S_U$(2)-UC ($L_2$ energizing during $S_1$ ON period)

$L_2$-$S_U$ (2)-UC-$S_4$ (body diode)-$S_L$ (2) ($L_2$ de-energizing during $S_2$ OFF period)

In still another embodiment of the technology described herein with reference to the FIGS. 9a and 9b, two distinct operating modes of the non-isolated multiport converter (100) are provided for recuperating regenerative power from the traction load (105) to the battery (103) in buck mode. The operation can be accomplished through two distinct modes. The first operating mode comprises of providing a PWM signal to the switch $S_2$ (302) for a specified period and a duty cycle corresponding to the step down voltage level in order to periodically energize and de-energize $L_1$ (601) and activation signals are provided to the switches $S_M$ (205) and $S_B$ (202) to couple at the desired positions for facilitating the desired flow of power. Accordingly, the power flow paths corresponding to energizing and de-energizing of $L_1$ (601) with the position of coupling of the low frequency bidirectional switches (202 and 205) are illustrated in FIG. 9a and is stated below;

$L_{TR}$-$C_T$-$S_2$-$L_1$-$S_M$ (2)-$S_B$ (2)-B ($L_1$ energizing during $S_2$ ON period)

$L_1$-$S_M$ (2)-$S_B$ (2)-B-$D_4$ ($L_1$ de-energizing during $S_2$ OFF period)

The second operating mode comprises of providing a PWM signal to the switch $S_1$ (301) for a specified period and a duty cycle corresponding to the step down voltage level in order to periodically energize and de-energize $L_2$ (602) and activation signals are provided to the switches $S_C$ (204), $S_B$ (202) and $S_L$ (203) respectively to couple at the desired positions for facilitating the desired flow of power. Accordingly, the power flow paths corresponding to energizing and de-energizing of $L_2$ (602) with the position of coupling of the low frequency bidirectional switches (203, 203 and 204) are illustrated in FIG. 9b and are stated below;

$L_{TR}$-$C_T$-$S_C$ (1)-$S_1$-$L_2$-$S_B$ (1)-B ($L_2$ energizing during $S_1$ ON period)

$L_2$-$S_B$ (1)-B-$S_4$ (body diode)-$S_L$ (2) ($L_2$ de-energizing during $S_2$ OFF period)

In yet another embodiment of the technology described herein with reference to the FIG. 10, an operating mode of the non-isolated multiport converter (100) is provided for continually supplying the auxiliary loads (104) in buck mode from any of the energy sources (101, 102, 103) or from regenerative power. The operating mode comprises of providing a PWM signal to the switch $S_3$ (303) for a specified period and a duty cycle corresponding to the step down voltage level in order to periodically de-energize $L_1$ (601) through the path $L_1$-$S_3$-$C_A$-$L_{AUX}$ thereby ensuring an uninterrupted supply of power to the auxiliary loads $L_{AUX}$ (104).

The following examples are given by way of illustration of the working of the technology in actual practice and therefore should not be constructed to limit the scope of the technology described herein.

Example 1

TABLE 2

| Parameters | Specifications |
| --- | --- |
| Fuel cell stack | 36 V, 1 kW |
| Battery (LiB) pack | 24 V, 40 Ah |
| Ultracapacitor module | 16 V, 58.3 F. |
| DC traction bus voltage | 48 V |
| Motor power rating | 1 kW |
| Average motor power demand | 600 W |
| Motor peak power demand during acceleration | 2 kW |

The following example demonstrates a typical working scenario of the non-isolated multiport converter configuration comprising of fuel cell, battery and ultracapacitor as the three energy sources powering the traction load of a mini electrified vehicle. The parametric specifications of the system are shown in Table 2. A typical load profile of 100 seconds duration along with the power sharing of fuel cell, battery and ultracapacitor are illustrated in FIG. 11. The operation of the non-isolated multiport converter is explained through various dynamic load power scenarios corresponding to steady speed operation, acceleration or regenerative braking of mini electrified vehicle. The load profile (Refer FIG. 11) is segmented in to successive events starting from event 1 to event 11 which are synonymous to a possible driving pattern of the vehicle. During each of the events of steady speed operation and acceleration, the load power is demanded from the energy sources resulting in forward flow of power from the energy sources to the traction load and during regenerative braking, a reverse flow of power from the load is facilitated to recuperate the regenerative energy in to the desired energy sources. Initially, both the battery and the ultracapacitor remain at a full charged condition with the terminal voltage at 28.5V and 16.2V respectively. The event 1 depicts a steady speed operation for 10 seconds when a nominal load power of nearly 500 W is supplied from the fuel cell utilizing the inductor Li by configuring the multiport converter as a conventional boost converter. The battery and the ultracapacitor remain idle during this event. In the next event, the vehicle undergoes a sudden acceleration for 4 seconds on account of which an instantaneous load power of 1.5 KW is demanded which brings the ultracapacitor in to the action for delivering the surplus amount of peak load power (1 kW) beyond the nominal power level (500 W). Under such scenarios, the multiport converter is operated such as to engage both the fuel cell and the ultracapacitor for supplying the peak load power simultaneously in boost mode through utilization of the inductor $L_1$ and $L_2$ respectively. At the end of the peak load interval, the ultracapacitor gets discharged up to 11V of its terminal voltage. In the next steady load power interval of 16 seconds, the converter is configured to allow the battery for delivering the load power of 750 W by utilizing the inductor $L_1$ through boost mode of operation. The succeeding event showcases a vehicle driving scenario of heavy acceleration for duration of 5 seconds where a peak load power of 1.7 KW is demanded. Initially, this event starts with both the battery and the ultracapacitor cumulatively supplying the total load power utilizing inductor $L_1$ and $L_2$ respectively with the ultracapacitor contributing majority of the peak load demand (950 W) while the battery delivers the remaining amount of 750 W. However, after 2 seconds, the ultracapacitor ceases to supply the load power owing to its terminal voltage dropped below the threshold voltage limit of 8V, thereby creating a dynamic transition in operating mode of the multiport converter where the battery gets flexibly configured in order to continue the supply of total load power of 1.7 KW for the remaining 3 seconds utilizing $L_2$. The next event once again showcases the operation of the multiport converter for delivering a nominal load power of <500 W which is fulfilled by the fuel cell by utilizing first inductor $L_1$. In addition to that, in this event, the fuel cell is also engaged to partially recharge the discharged ultracapacitor in buck mode by utilizing the inductor $L_2$ for the total duration of 12 seconds of the steady speed operating scenario. At the end of this interval, the ultracapacitor gets recharged up to 11V. The vehicle experiences a sudden braking immediately after completion of the steady speed event, where the ultracapacitor gets engaged to recuperate the regenerative power of 1.2 KW from the load in buck mode through utilization of the inductor $L_2$ for the duration of 3 seconds. After the completion of the regenerative event, the ultracapacitor is recharged up to 15.6V and the operation of the multiport converter is resumed to deliver the steady load power of >500 W in boost mode by engaging the battery for next 8 seconds. The vehicle further experiences a prolonged braking event of 7 seconds where the ultracapacitor is initially prioritized to capture the regenerative power of 950 W in buck mode through utilization of the inductor $L_2$ until it gets fully recharged after 1 second. After 1 second, the battery is engaged to recuperate the total regenerative power through inductor $L_2$ for the remaining 6 seconds of the braking interval, thereby averting loss of any amount of the generated braking energy. The next steady speed operating interval experiences a load power demand of <500 W which is fulfilled by engaging the fuel cell for 11 seconds till the arrival of the next peak load demand scenario of 4 seconds. In this event, both the battery and ultracapacitor are simultaneously engaged to cumulatively deliver the total load power of 1.8 kW where the ultracapacitor gets discharged up to 10.8V by delivering a power of 1050 W while the battery supplies the remaining 750 W. After the completion of the peak load interval the battery continues to deliver the steady load demand of 650 W by utilizing the inductor $L_1$ while steadily recharging the ultracapacitor in buck mode by utilizing the inductor $L_2$ for the period of 20 seconds.

Some advantages of the technology described herein are highlighted as follows:
1. The technology offers the flexibility of integrating three different energy sources of dissimilar characteristics and voltage/current ratings on a single common platform.
2. The non-isolated multiport converter is devoid of any bulky components like a transformer, which aids in having a compact design with improved efficiency.
3. The invented configuration provides multiple options for charging the ultracapacitor and the battery.
4. It ensures flexibility in power flow management among multiple sources and loads.
5. It provides simultaneous and bidirectional power transfer capability in multiple number of ports.
6. It ensures single stage power processing in all possible power flow combinations, thereby ensures improved efficiency.
7. It offers the flexibility of integrating auxiliary loads in to the same platform, thereby eliminating the requirement of an additional dc-dc converter.
8. It utilizes minimum number of magnetic components for achieving the desired flexibility, thereby minimizing the cost and size of the energy storage system.
9. It ensures judicious utilization of the energy sources and components by maneuvering the flow of power among the multiple dc ports.
10. It improves power delivering capability of the energy storage system.
11. It ensures effective recuperation of regenerative energy from the traction load.

What is claimed is:
1. A Non-Isolated Multiport DC-DC Converter to Integrate Multiple Energy Sources for Electrified Vehicles which comprises:
three separate dc ports configured as source ports dedicated for interfacing fuel cell, battery and ultracapacitor, respectively;
two separate de ports configured as load ports dedicated for interfacing traction load and auxiliary loads respectively; and
three high frequency unidirectional switches, two high frequency bidirectional switches, five low frequency bidirectional switches, four power diodes, two inductors and two capacitors wherein; the high frequency unidirectional switches are selectively controlled by a pulse width modulated signal or a continuous signal depending upon the operating mode; wherein the high frequency bidirectional switches are controlled by a pulse width modulated signal to ensure transfer of power in boost and buck mode according to the desired operation, the low frequency bidirectional switches are controlled by providing activation signals to selectively couple at first position or second position, according to the operating mode, in order to establish an electrical power flow path for facilitating the desired flow of electrical current, the power diodes ensures an unidirectional flow of power and prevents the undesirable reverse flow of power during each power transfer scenario, the inductors are periodically energized and de-energized depending upon the control signal of the high frequency switches to accomplish power transfer in boost and buck mode, and the capacitors are positioned at the dc load ports to filter out the undesirable ripple components from the generated dc voltage at the load ports.

2. The non-isolated multiport dc-dc converter of claim 1 configured for delivering power to the traction load from the fuel cell in boost mode wherein, the first inductor is periodically energized and de-energized by providing a pulse width modulated signal to the transistor of the second high frequency bidirectional switch corresponding to a desired step up voltage.

3. The non-isolated multiport dc-dc converter of claim 1 configured for delivering power to the traction load from the battery in boost mode wherein;

the first inductor is periodically energized and de-energized by providing a pulse width modulated signal to the transistor of the second high frequency bidirectional switch corresponding to a desired step up voltage and simultaneously providing activation signals to the second and fourth low frequency bidirectional switches to couple at their respective second positions and the fifth low frequency bidirectional switch to couple at its first position; or, the second inductor is periodically energized and de-energized by providing a pulse width modulated signal to the transistor of the first high frequency bidirectional switch corresponding to a desired step up voltage and simultaneously providing activation signals to the second low frequency bidirectional switch to couple at its first position and the third low frequency bidirectional switch to couple at its second position.

4. The non-isolated multiport dc-dc converter of claim 1 configured for delivering power to the traction load from the ultracapacitor in boost mode wherein;

the first inductor is periodically energized and de-energized by providing a pulse width modulated signal to the transistor of the second high frequency bidirectional switch corresponding to a desired step up voltage and simultaneously providing activation signals to the first and fifth low frequency bidirectional switches to couple at their respective first positions and the fourth low frequency bidirectional switch to couple at its second position; or, the second inductor is periodically energized and de-energized by providing a pulse width modulated signal to the transistor of the first high frequency bidirectional switch corresponding to a desired step up voltage and simultaneously providing activation signals to the first and third low frequency bidirectional switches to couple at their respective second positions.

5. The non-isolated multiport dc-dc converter of claim 1 configured for charging the ultracapacitor from the fuel cell in the boost and buck mode wherein;

during boost mode charging, a pulse width modulated signal corresponding to a desired step up voltage is provided to the transistor of the first high frequency bidirectional switch in order to periodically energize and de-energize the second inductor while a continuous ON signal is provided to the transistor of the first high frequency unidirectional switch for the entire duration of the operating period and activation signals are simultaneously provided to the first and fourth low frequency bidirectional switches to couple at their respective second positions and third low frequency bidirectional switch to couple at its first position;

during buck mode charging, a pulse width modulated signal corresponding to a desired step down voltage is provided to the transistor of the first high frequency unidirectional switch in order to periodically energize and de-energize the second inductor and activation signals are simultaneously provided to the first, third and fourth low frequency bidirectional switches to couple at their respective second positions.

6. The non-isolated multiport dc-dc converter of claim 1 configured for charging the battery from the fuel cell in the boost and buck mode wherein;

during boost mode charging, a pulse width modulated signal corresponding to a desired step up voltage is provided to the transistor of the first high frequency bidirectional switch in order to periodically energize and de-energize the second inductor while a continuous ON signal is provided to the transistor of the first high frequency unidirectional switch for the entire duration of the operating period and activation signals are simultaneously provided to the second and third low frequency bidirectional switches to couple at their respective first positions and fourth low frequency bidirectional switch to couple at its second position;

during buck mode charging, a pulse width modulated signal corresponding to a desired step down voltage is provided to the transistor of the first high frequency unidirectional switch in order to periodically energize and de-energize the second inductor and activation signals are simultaneously provided to the third and fourth low frequency bidirectional switches to couple at their respective second positions and the second low frequency bidirectional switch to couple at its first position.

7. The non-isolated multiport dc-dc converter of claim 1 configured for charging the ultracapacitor from the battery in the boost and buck mode wherein;

during boost mode charging, a pulse width modulated signal corresponding to a desired step up voltage is provided to the transistor of the first high frequency bidirectional switch in order to periodically energize and de-energize the second inductor while a continuous ON signal is provided to the transistor of the first high frequency unidirectional switch for the entire duration of the operating period and activation signals are simultaneously provided to the first and second low frequency bidirectional switches to couple at their respective second positions and, third and fifth low frequency bidirectional switches to couple at their respective first positions;

during buck mode charging, a pulse width modulated signal corresponding to a desired step down voltage is provided to the transistor of the first high frequency unidirectional switch in order to periodically energize and de-energize the second inductor and activation signals are simultaneously provided to the first and second low frequency bidirectional switches to couple at their respective second positions and, third and fifth low frequency bidirectional switches to couple at their respective first positions.

8. The non-isolated multiport dc-dc converter of claim 1 configured for recuperating regenerative power from the traction load into the ultracapacitor in buck mode wherein;
the first inductor is periodically energized and de-energized by providing a pulse width modulated signal to the transistor of the second high frequency unidirectional switch corresponding to a desired step down voltage and simultaneously providing activation signals to the first low frequency bidirectional switch to couple at its first position and the fifth low frequency bidirectional switch to couple at its second position; or
the second inductor is periodically energized and de-energized by providing a pulse width modulated signal to the transistor of the first high frequency unidirectional switch corresponding to a desired step down voltage and simultaneously providing activation signals to the first and third low frequency bidirectional switches to couple at their respective second positions and fourth low frequency bidirectional switch to couple at its first position.

9. The non-isolated multiport dc-dc converter of claim 1 configured for recuperating regenerative power from the traction load in to the battery in buck mode wherein;
the first inductor is periodically energized and de-energized by providing a pulse width modulated signal to the transistor of the second high frequency unidirectional switch corresponding to a desired step down voltage and simultaneously providing activation signals to the second and fifth low frequency bidirectional switches to couple at their respective second positions; or
the second inductor is periodically energized and de-energized by providing a pulse width modulated signal to the transistor of the first high frequency unidirectional switch corresponding to a desired step down voltage and simultaneously providing activation signals to the second and fourth low frequency bidirectional switches to couple at their respective first positions and the third low frequency bidirectional switch to couple at its second position.

10. The non-isolated multiport dc-dc converter of claim 1 configured for continually supplying power to the auxiliary loads from the energy sources and from regenerative power in buck mode wherein, the first inductor is periodically de-energized by providing a pulse width modulated signal to the transistor of the third high frequency unidirectional switch corresponding to a desired step down voltage.

11. The non-isolated multiport dc-dc converter as claimed in claim 1 wherein the voltage and current ratings of fuel cell, battery and ultracapacitor are of no specific order or range and the high frequency bidirectional switches and high frequency unidirectional switches are realized as preferably silicon (Si) based semiconductor devices or wide band gap (WBG) semiconductor devices.

* * * * *